VARIABLE VOLTAGE NETWORKS
Filed Feb. 7, 1966
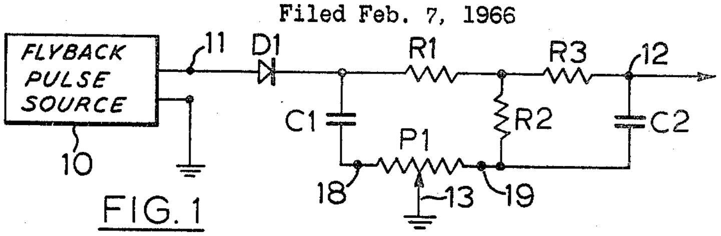
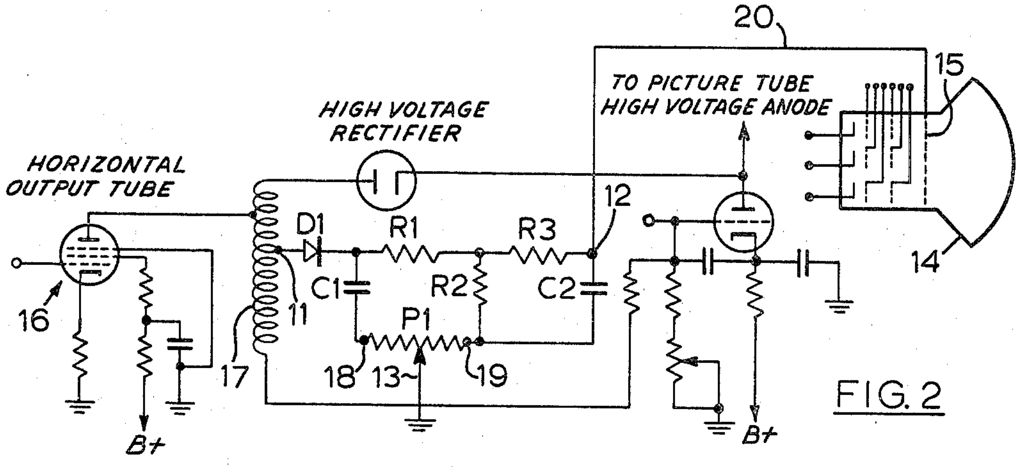
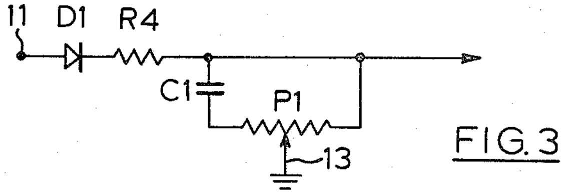
FIG. 3
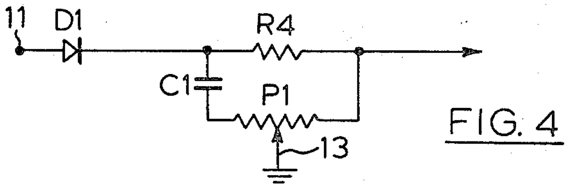
FIG. 4
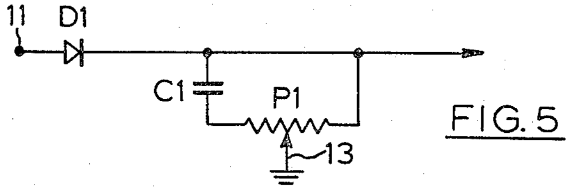
FIG. 5
INVENTOR.
JOHN J. SENNIK
BY
PATENT AGENT United States Patent Office 3,417,285
Patented Dec. 17, 1968

3,417,285

VARIABLE VOLTAGE NETWORKS

John J. Sennik, Kitchener, Ontario, Canada, assignor to Electrohome Limited

Filed Feb. 7, 1966, Ser. No. 525,488
11 Claims. (Cl. 315—31)

ABSTRACT OF THE DISCLOSURE

A variable voltage network for supplying focus voltage to cathode ray tubes. Periodic voltage pulses are applied to a circuit including a rectifier, resistor, capacitor and potentiometer, with the slider of the potentiometer being connected to a terminal at a reference potential to enable complementary AC and DC impedance variations.

This invention relates to networks for producing variable output voltages. This invention also relates to colour television receivers having new and improved variable voltage supplies that may be used to satisfy the variable focus voltage requirements of colour kinescopes.

Colour picture tubes and other devices that operate using high potentials require high voltage focussing voltages, and the focussing voltages should be variable.

Many networks capable of producing variable output voltages have been designed to meet the variable focus voltage requirements of a colour picture tube. Networks presently in use and known as AC impedance variation circuits (multitap and multiwinding transformers), if designed for a wide range of voltage adjustments, are complex and expensive. On the other hand, DC impedance variation circuits, if designed for low cost, are limited in their voltage range.

A relatively simple and inexpensive variable voltage network is shown in FIGURE 2 of United States Patent No. 2,879,447, issued Mar. 24, 1959, J. O. Preisig. This network will provide only an AC impedance variation, however, since the impedance of the network between output terminal F and ground does not vary with the position of slider 18.

In accordance with this invention, there are provided simple and inexpensive variable voltage networks capable of producing a wide range of output voltages by virtue of a design in which both AC and DC impedance variation of a complementary nature are obtained simultaneously.

A network constituting a preferred embodiment of this invention includes a source of periodic voltage pulses which has an output terminal at which these periodic voltage pulses appear, a rectifier, a capacitor having first and second terminals, first and second resistors each having first and second terminals, a potentiometer having first and second terminals and a slider, and a terminal at a reference potential. The rectifier is connected between the output terminal of the source of periodic voltage pulses and one of the terminals of each of the capacitor and first resistor. The other terminal of the first resistor and one of the terminals of the second resistor are connected, while the potentiometer is connected between the other terminals of the capacitor and the second resistor. The output terminal of the network is so connected that it is supplied with a voltage developed between the output terminal of the network and the terminal at the reference potential, this voltage including at least a part of the voltage developed across the second resistor. The terminal at the reference potential and the slider are connected, whereby the charging rate of the capacitor and the impedance between the output terminal of the network and the terminal of the reference potential both are varied simultaneously by varying the position of the slider of the potentiometer.

This invention will become more apparent from the following detailed description, taken in conjunction with the appended drawings, in which:

FIGURE 1 shows a circuit that constitutes a preferred embodiment of this invention, FIGURE 2 is a circuit diagram of part of a colour television receiver employing the network of FIGURE 1, FIGURES 3 and 4 illustrate alternative embodiments of this invention, and FIGURE 5 illustrates a less practical embodiment of the invention.

Referring to FIGURE 1, there is shown a source 10 of periodic voltage pulses having an output terminal 11 at which the periodic voltage pulses appear. Source 10 may be a flyback pulse source, which may comprise, for example, the horizontal output tube and horizontal output transformer of the horizontal deflection system of a television receiver, output terminal 11 being connected to a suitable tap on the horizontal output transformer.

A rectifier in the form of a solid state diode D1 has its anode connected to terminal 11. The cathode of diode D1 is connected to one terminal of each of a capacitor C1 and a resistor R1, the latter serving a filtering function. The other terminal of resistor R1 is connected to one terminal of a resistor R2, which serves a current limiting function and protects diode D1, and also to the output terminal 12 of the network via a resistor R3, which, with a capacitor C2, constitutes a conventional RC filter (optional). If desired, instead of connecting resistors R3 and R2 as shown in the figures, resistor R2 may be a potentiometer, and the slider of this potentiometer may be connected to resistor R3, while the terminal of resistor R2 now shown as connected to both resistors R1 and R3 would be disconnected from resistor R3 and would remain connected only to resistor R1. With such a connection only a part of the voltage developed across resistor R2 would be supplied to output terminal 12, and this part could be varied by varying the position of the slider of the potentiometer which replaces resistor R2.

Connected between the other two terminals of capacitor C1 and resistor R2 is a potentiometer P1. The slider 13 of potentiometer P1 is connected to a terminal that is at a reference potential, which, in the circuit illustrated, is ground potential.

In FIGURE 2 the same network is shown in FIGURE 1 is illustrated as it may be used in a colour television receiver employing a three gun, multi-grid electrode, colour picture tube 14 having a focussing electrode 15. The various components of the colour television receiver illustrated, with the exception of the variable voltage network, are known in the art and require no description. It will be noted, however, that the flyback pulse source 10 of FIGURE 1 is constituted in FIGURE 2 by the horizontal output tube 16 and horizontal output transformer 17 of the television receiver.

In operation, if slider 13 is to the left-hand side of potentiometer P1, i.e., closest to terminal 18 thereof, for any given periodic pulses supplied via diode D1, the charging rate of capacitor C1 will be at a maximum. Similarly, the voltage appearing at output terminal 12 will be at a maximum, not only because capacitor C1 will have been charged at its amximum rate, but also because the DC impedance between output terminal 12 and ground (slider 13) will be a maximum.

On the other hand, if slider 13 is to the right-hand side of potentiometer P1, i.e., closest to terminal 19 thereof, for any given periodic pulses supplied via diode D1, the charging rate of capacitor C1 will be at a minimum. Similarly, the voltage appearing at output terminal 12 will be at a minimum, not only because capacitor C1 will have been charged at its minimum rate, but also because the DC impedance between output terminal 12 and and ground (slider 13) will be at a minimum.

By the positioning of slider 13 at points intermediate the two terminals 18 and 19 of potentiometer P1, output voltages of varying magnitudes between the maximum and minimum output voltages may be obtained.

It will be noted that in all cases the variable output voltage which is obtained is a result of both an AC and a DC impedance variation, and that these impedance variations are complementary. Furthermore, both the AC and DC impedance variations are obtained simultaneously as a result of varying the position of slider 13.

If resistor R2 is replaced with a potentiometer as suggested hereinbefore, it should be noted that care will have to be taken to ensure that the slider of this potentiometer and slider 13 never are permitted to create a short circuit between output terminal 12 and ground. Under these circumstances diode current would be limited only by resistor R1, and this resistor may not be sufficiently large to prevent damage to diode D1 caused by excessive diode current.

While a smoothing filter consisting of resistor R3 and capacitor C2 has been shown as part of a network embodying this invention, in some cases it may be possible to dispense with a smoothing filter of any type. Of course, other types of smoothing filters may be employed.

As shown in FIGURE 2, output terminal 12 is connected via a conductor 20 to focussing electrode 15 so as to permit the variable output voltage appearing at terminal 12 to be applied to focussing electrode 15.

In the circuit of FIGURE 3 resistors R1 and 2 have been eliminated and a resistor 4 has been added as shown. This resistor performs no filtering function but is sufficiently large to protect diode D1 if slider 13 is moved to the right-hand side of potentiometer P1.

In the circuit of FIGUE 4 resistor R4 serves both a filtering and a current limiting function.

The simplest circuit is that shown in FIGURE 5. This circuit is less practical, however, since there is no protection for diode D1 if slider 13 is moved to the right-hand side of potentiometer P1, and, with the slider in this position, there would be a large degree of ripple in the unfiltered output voltage.

While reference has been made herein to a potentiometer having a slider, it would not depart from this invention to employ equivalent devices such as a resistor with taps and a switch having a contact arm which can engage the various taps selectively. Where reference is made herein to a potentiometer with a slider, this language is intended to cover such equivalent devices.

A circuit embodying this invention which has been successfully tested employed the following components, but these are merely illustrative of the invention:

| | | |
|---|---|---|
| Resistor R1 | MΩ | 4.7 |
| Resistor R2 | MΩ | 66 |
| Potentiometer P1 | MΩ | 10 |
| Capacitor C1 | pf | 130 |

While preferred embodiments of this invention have been disclosed herein, those skilled in the art will appreciate that changes and modifications may be made therein without departing from the spirit and scope of this invention as defined in the appended claims.

What I claim as my invention is:

1. A network for producing a variable output voltage and having an output terminal at which said variable voltage appears, said network also including a source of periodic voltage pulses having an output terminal at which said periodic voltage pulses appear; a rectifier; a capacitor having first and second terminals; a first resistor having first and second terminals; a second resistor having first and second terminals; a potentiometer having first and second terminals and a slider; a terminal at a reference potential; means connecting said rectifier between said output terminal of said source of periodic voltage pulses and one of said terminals of each of said capacitor and said first resistor; means connecting the other of said terminals of said first resistor and one of said terminals of said second resistor; means connecting said potentiometer between the other of said terminals of said capacitor and said second resistor; said output terminal of said network being connected to said second resistor for supplying to said output terminal a voltage developed between said output terminal and said terminal at said reference potential and including at least a part of the voltage developed across said second resistor; and means connecting said terminal at said reference potential and said slider, whereby the charging rate of said capacitor and the impedance between said output terminal of said network and said terminal at said reference potential both are varied simultaneously by varying the position of said slider of said potentiometer.

2. A network according to claim 1 wherein said output terminal of said network is connected to said one terminal of said second resistor.

3. In a colour television receiver including a colour kinescope having a focussing electrode and a horizontal output transformer, a network according to claim 1, and means connecting said output terminal of said network and said focussing electrode for supplying a variable voltage from said network to said focussing electrode, said source of periodic voltage pulses including said horizontal output transformer.

4. The invention according to claim 3 wherein said output treminal of said network is connected to said one terminal of said second resistor.

5. A network for producing a variable output voltage and having an output terminal at which said variable voltage appears, said network also including a source of periodic voltage pulses having an output terminal at which said periodic voltage pulses appear; a rectifier having input and output terminals; said input terminal of rectifier being connected to said output terminal of said source of periodic voltage pulses to rectify said periodic voltage pulses, and said output terminal of said rectifier being connected via a D.C. path to said output terminal of said network; a potentiometer having first and second terminals and a slider; a terminal at a reference potential; means connecting said slider and said terminal at said reference potential; a capacitor; means connecting said capacitor in a circuit between said rectifier and said terminal at at said reference potential to be charged by said periodic voltage pulses as rectified by said rectifier, said circuit including said rectifier, said capacitor, said first terminal of said potentiometer, the part of said potentiometer between said first terminal and said slider, said slider and said terminal at said reference potential; and a second D.C. path between said output terminal of said network and said terminal at said reference potential, said second D.C. path including said output terminal of said network, said second terminal, the part of said potentiometer between said second terminal and said slider, said slider and said terminal at said reference potential; said potentiometer and said slider thereby being so connected in said circuit and said second D.C. path that the charging rate of said capacitor and the D.C. impedance of said second D.C. path both are varied simultaneously by varying the position of said slider of said potentiometer to simultaneously increase said charging rate and said D.C. impedance by movement of said slider in one direction and to simultaneously decrease said charging rate and said D.C. impedance by movement of said slider in the opposite direction.

6. A network according to claim 5 wherein said D.C. path between said output terminal of said rectifier and said output terminal of said network includes a resistor.

7. A network according to claim 6 wherein said resistor is connected between said capacitor and said output terminal of said network.

8. A network according to claim 6 wherein said resistor is connected between said output terminal of said rectifier and said capacitor.

9. A network according to claim 5 wherein said D.C. path between said output terminal of said rectifier and said output terminal of said network includes a first resistor and wherein said second D.C. path includes a second resistor, said second resistor being connected between said second terminal and said output terminal of said network.

10. A network according to claim 9 wherein said first resistor is connected between said capacitor and said output terminal of said network.

11. In combination, a network according to claim 5; a colour kinescope having a focussing electrode; and means connecting said output terminal of said network and said focussing electrode for supplying a variable voltage from said network to said focussing electrode.

References Cited

UNITED STATES PATENTS

| | | | |
|---|---|---|---|
| 2,546,028 | 3/1951 | Foster | 315—31 |
| 2,879,447 | 3/1959 | Preisig | 315—31 |
| 3,201,642 | 8/1965 | Stark | 315—31 |

RODNEY D. BENNETT, *Primary Examiner.*

H. C. WAMSLEY, *Assistant Examiner.*

U.S. Cl. X.R.

323—79